Jan. 6, 1970  J. GUGLIOTTA ETAL  3,488,125
EXPOSURE METER WITH NEEDLE CLAMPING SCALE CHANGING
AND FILTER ACTUATING MECHANISM

Filed March 7, 1966

INVENTORS
John Gugliotta
BY    Kenneth J. Riddle

Edwin C. Pearson
ATTORNEY

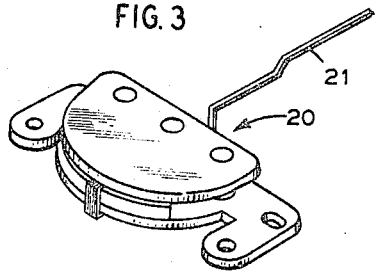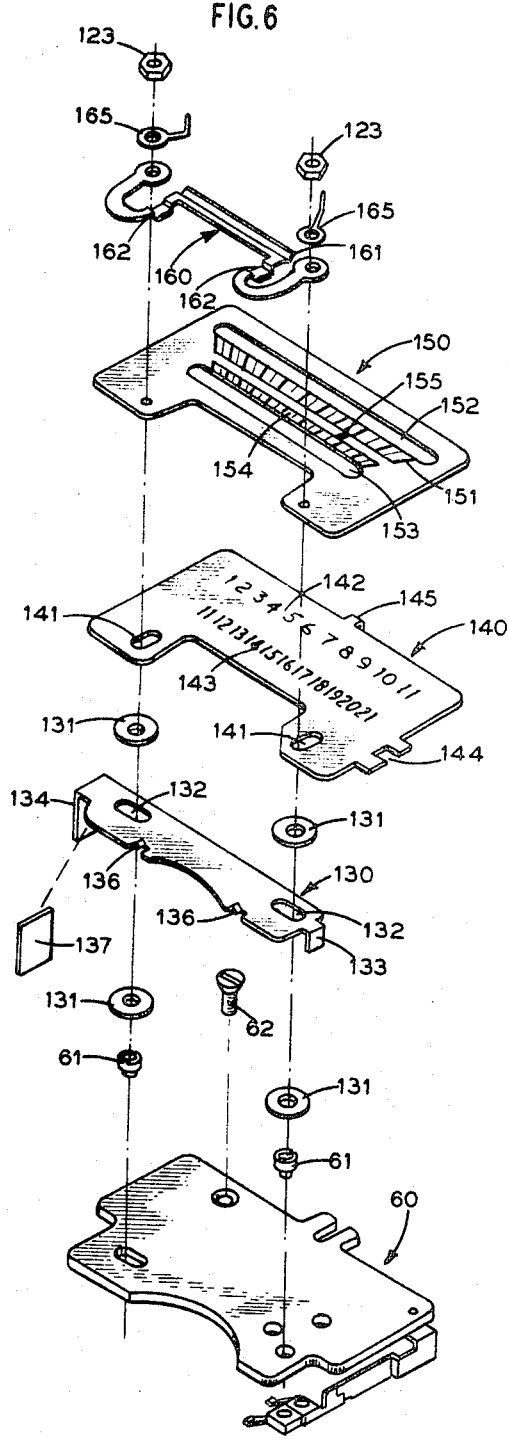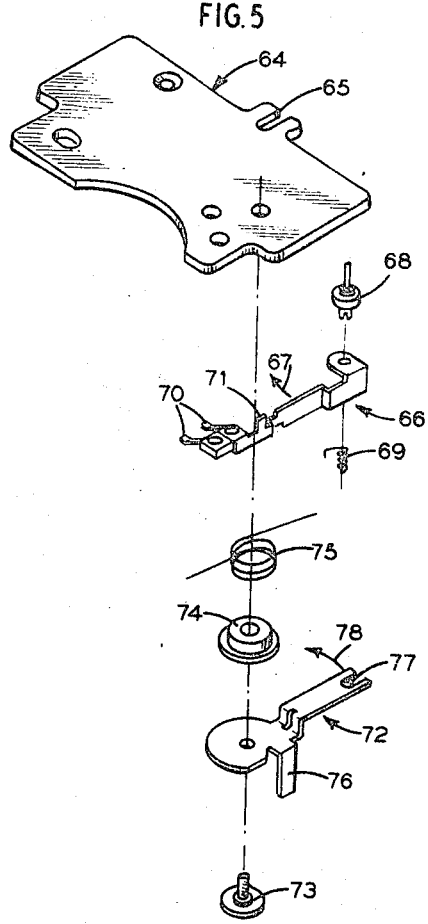

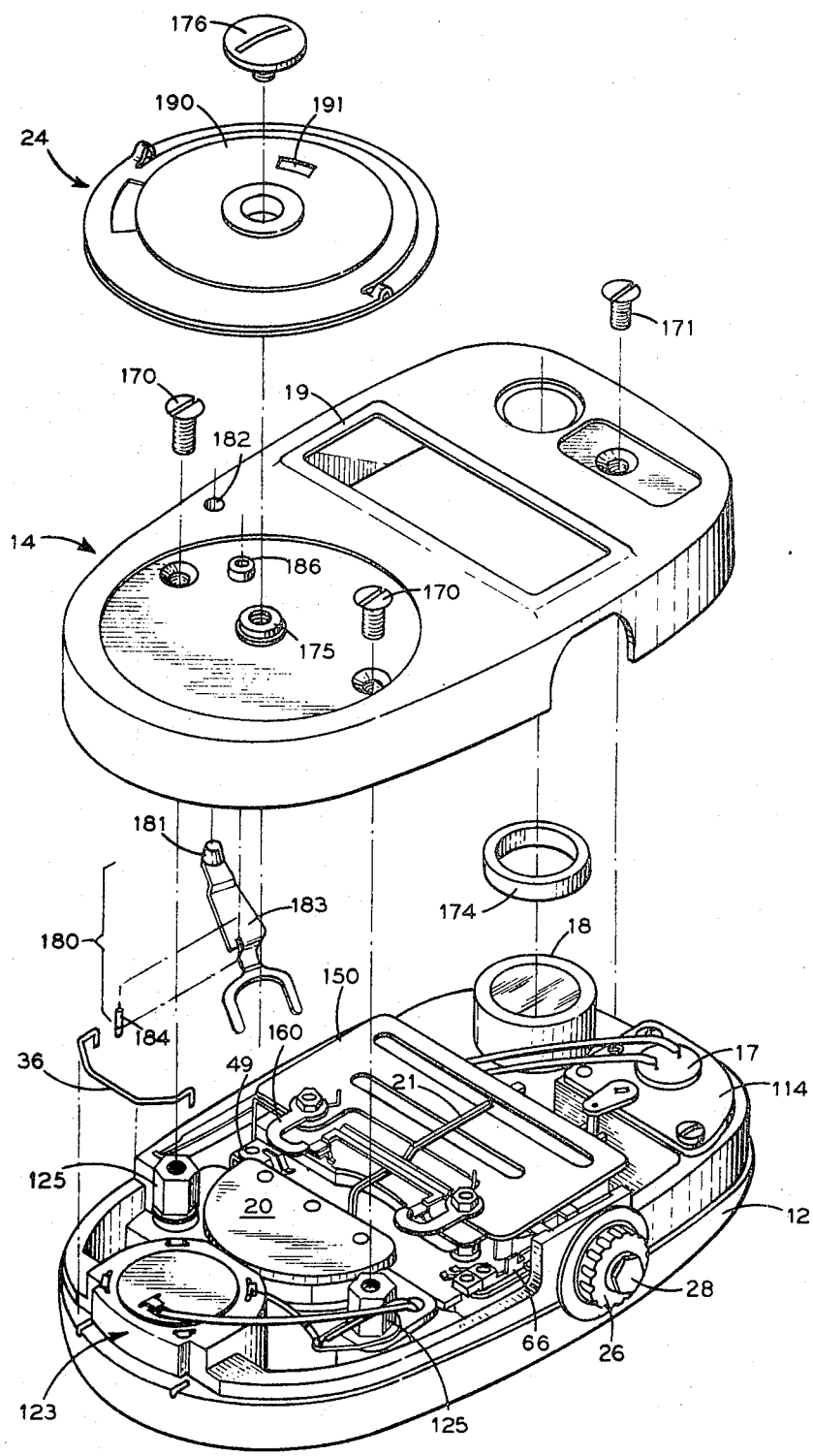

United States Patent Office 3,488,125
Patented Jan. 6, 1970

---

3,488,125
EXPOSURE METER WITH NEEDLE CLAMPING SCALE CHANGING AND FILTER ACTUATING MECHANISM
John Gugliotta, Clark, and Kenneth J. Riddle, Nutley, N.J., assignors to Weston Instruments, Inc., Newark, N.J., a corporation of Delaware
Filed Mar. 7, 1966, Ser. No. 532,199
Int. Cl. G01j 1/42
U.S. Cl. 356—224      6 Claims

ABSTRACT OF THE DISCLOSURE

A photometer having apparatus for actuating a scale range changing mechanism, for presetting a linkage to change the position of a filter, for changing circuit connections to a meter deflecting motor, and for clamping the meter needle after a reading has been obtained. A single assembly is used to accomplish all functions, part being rotatable and axially movable, and another part being axially movable relative to the first part and also relative to the rest of the meter. The relative motion between the two parts is designed to assure that the needle is clamped before the deflection motor is electrically disconnected after the reading has been taken.

---

This invention relates to photometers, and in particular to exposure meters for measuring incident light used to determine exposure data for photographic purposes.

One type of exposure meter presently available has a photoelectric transducer including a photoconductive light cell and a battery as a source of power. The transducer, which converts incident light into electrical energy, energizes a galvanometer-type mechanism having an indicating pointer which is deflected in accordance with the D'-Arsonval principle. Deflection of the pointer is dependent upon the amount of light impinging upon the light cell which may be varied to have several ranges of sensitivities by using some type of filter.

In the use of such meters, it is very important that certain of the operational steps occur in a particular sequence. Specifically, it is necessary that after the pointer has been deflected, it must be clamped before de-energizing the galvanometer-type mechanism and before changing the position of any filter that might have been used in obtaining the deflection.

The prior art accomplished this sequence of operations by using a type of lever or knob which, as it is moved, actuates a series of linkages or subassemblies to perform each operation in its proper order. This requires carefully designed and manufactured subassemblies which will only operate in the above-described sequence. This problem is particularly acute due to the space and weight limitations in an exposure meter which must be compact and lightweight, so it can easily be held in the operator's hand.

The applicant's invention contemplates solving this proper sequential operational problem by using a two element type of actuating mechanism, such as a knob and button, so that only after one of the elements has performed its functions will the second element be operable to perform its functions. This virtually insures the proper sequence to take place.

In addition, the applicant's invention contemplates using one of these elements, namely the knob, to perform some of the ancillary functions, such as changing scales for different sensitivity ranges and presetting a linkage to change the position of the filter, if desired.

Therefore, it is an object of this invention to provide for a new and improved exposure meter.

With this and other objects in mind, the features and advantages of the present invention will be best understood from the following description when read in conjunctions with the accompanying drawings. It will be understood that the description and accompanying drawings are for purposes of illustrating a preferred embodiment and are not to be construed as defining the scope or limits of the invention, reference being had for the latter purpose to the appended claims.

FIGURE 3 is a perspective view of the galvanometer-type mechanism used in the exposure meter;

FIGURE 5 is an exploded view of one of the subassemblies of FIGURE 4;

FIGURE 6 is an exploded view which is a further extension of FIGURE 4;

FIGURE 7 shows all of the elements of FIGURE 3 through 6 assembled and an exploded view of the remainder of the exposure meter.

Figure 2:
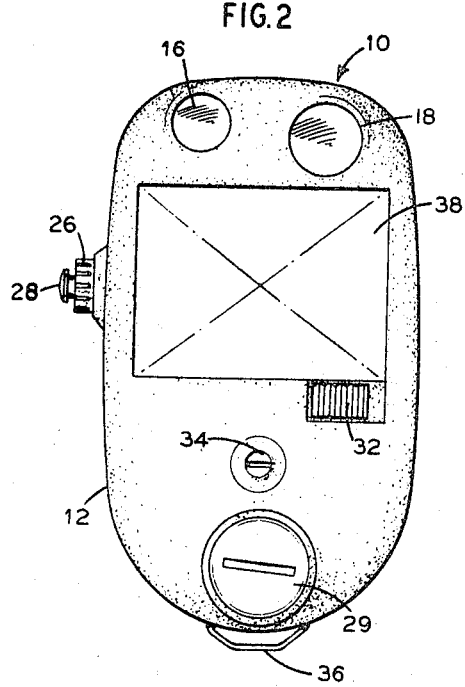
FIGURE 2 is a bottom view of the assembled exposure meter.
Figure 1:
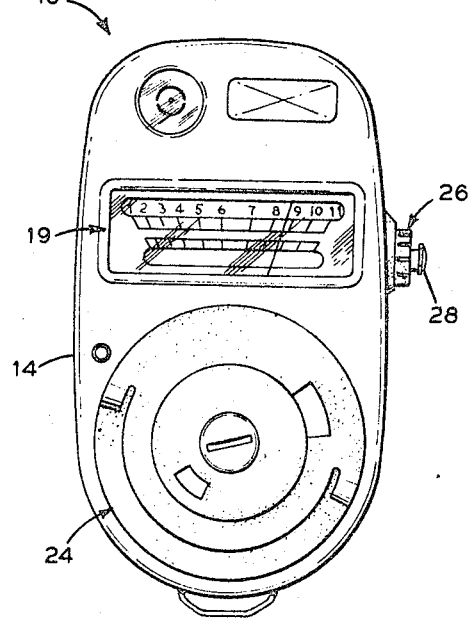
FIGURE 1 is a top view of the assembled exposure meter.

Referring to FIGURES 1 and 2, an exposure meter, generally designated as 10, comprises a base 12 which constitutes the back side of the meter and a cover 14 which constitutes the front side of the meter. Throughout this description the longer dimension of the meter in FIGURE 1 or 2 will be referred to as the longitudinal direction and the shorter dimension of the meter in FIGURE 1 or 2 will be referred to as the transverse direction.

A light aperture 16 in the base 12 allows the incident light to impinge upon a light cell 17 (see FIGURE 4) and a viewfinder 18 is for the operator to accurately face the meter in any desired direction. A window 19 is provided in the cover 14 in order to read the deflection of a pointer 21 of a galvanometer-type mechanism 20 (see FIGURE 3) which operates in accordance with the D'Arsonval principle. Further details of the particular compact mechanism illustrated in FIGURE 3 can be obtained by referring to pending application Ser. No. 517,233 filed Dec. 29, 1965, and assigned to the same assignee as this application. The deflection of the pointer 21 is dependent upon the amount of light impinging on the light cell 17. A three piece calculator assembly 24 is mounted on the cover 14 for converting the reading of the pointer deflection into useful information for setting the diaphragm opening and shutter speed on a camera.

Referring to FIGURE 1, on one side of the meter 10, hereinafter to be referred to as the right side, a "Range Selector and On-Off" knob 26 is provided to change the scale observable in the window 19 depending upon the intensity of the light, and to electrically connect the light cell 17 with the meter mechanism 20 and a "Pointer Release" button 28 is provided to allow the pointer 21 to move freely depending upon the amount of the current flowing through the mechanism 20. A battery chamber cover 29 is mounted in the base 12 in order to make a battery 30 (see FIGURE 4) readily accessible. A battery check switch 32 is used to check the strength of the battery 30 and a zero corrector 34 is provided to set the pointer 21 at some reference level. Also a loop 36 is provided for a neckstrap and a nameplate 38 is mounted on the base 12.

Figure 4:
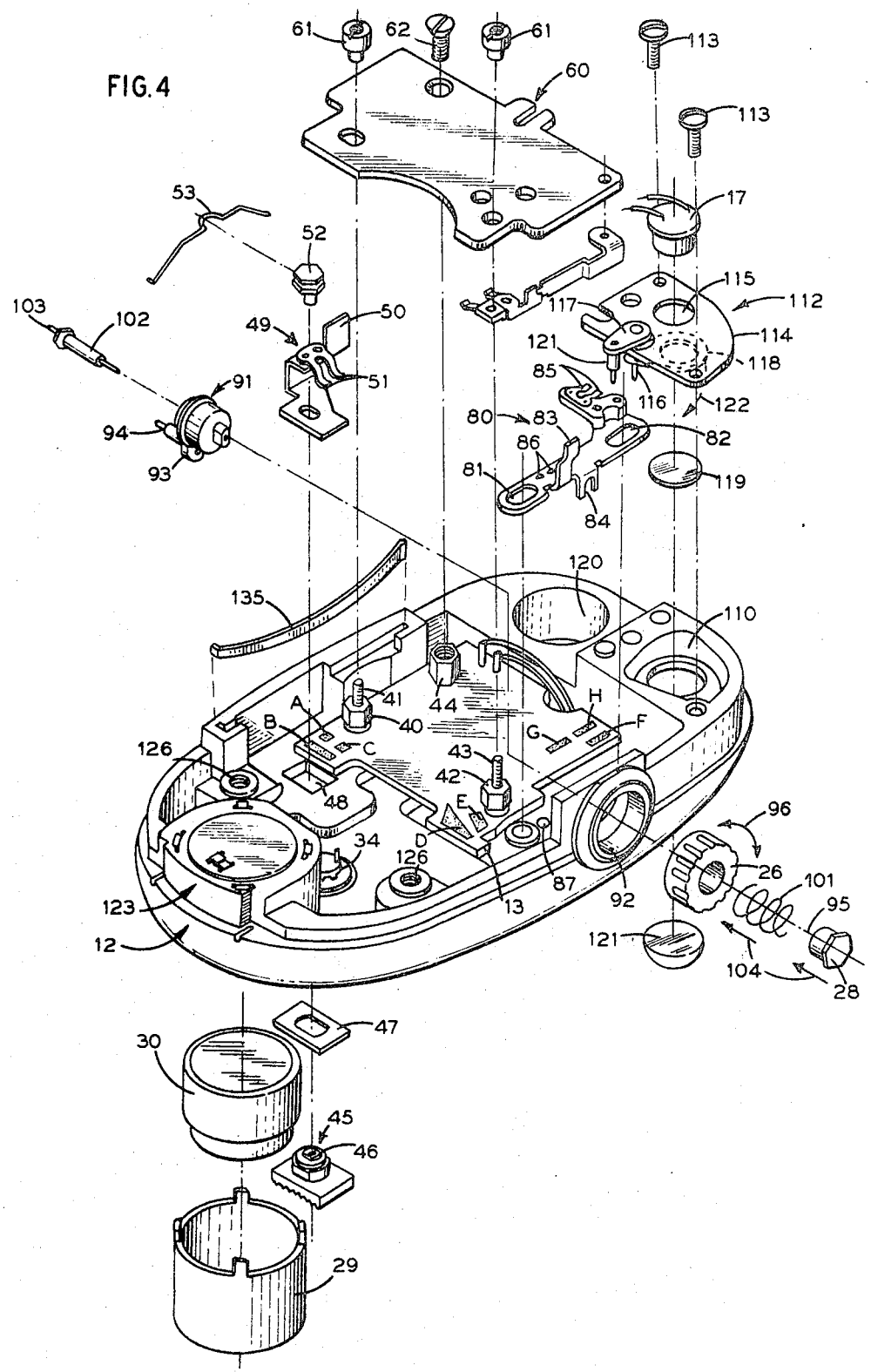
FIGURE 4 is a partially exploded and partially assembled view of the exposure meter.

Referring to FIGURE 4, the molded base 12 of the meter 10 is made of a plastic material containing many different shaped contours and apertures upon which are mounted the numerous subassemblies. The face of the base 12 shown in FIGURE 2 but hidden in FIGURE 4 will hereinafter be referred to as the exterior side of the base and is the back side of the meter.

A printed circuit board 13 is mounted approximately in the center of the base 12 with studs 40, 42 and 44 holding it thereon. Exact details of the printed circuit diagram are not shown but contacts to the various circuit networks, which contacts are designated as A through H are shown for better understanding of the relationship of all the subassemblies. Two of the studs 40 and 42 have extended posts 41 and 43 which are for mounting further subassemblies.

The battery check switch 32 comprises a button 45 with a post-like extension 46 and an associated insulating washer 47. The post-like extension 46 fits through an aperture 48 in the base 12 and mounted thereon is a battery check bracket 49 including a tab-like projection 50 and two finger-like contact members 51—51. A double headed screw 52 holds the bracket 49 to the button 45. The contact members 51—51 rest on top of the printed circuit board 13 and in the normal off-position of the battery check switch 32 the circuit networks associated with contacts B and C are connected. When the battery check switch is actuated, the contact members 51—51 connect the circuit networks associated with contacts B and A. A spring member 53 holds the battery check switch in a normally off position.

An actuator plate assembly 60 is mounted over the studs 40, 42 and 44 with two nuts 61—61 and a screw 62. The details of the actuator plate assembly 60 can be more readily seen by referring to FIGURE 5. The actuator plate assembly 60 comprises an actuator plate 64 having a groove 65. The purpose of the groove 65 will be discussed later. An arm assembly 66 and a filter actuator arm 72 are mounted on the actuator plate 64.

The arm assembly 66 is mounted for rotation, as shown by the arrow 67, about pivot 68 on the underside of actuator plate 64 with a spring biasing means 69. The arm assembly 66 includes two contact members 70—70 which are insulated from the remainder of the arm assembly and rest on top of the circuit board 13 adjacent to contacts D and E. The arm assembly has a projection 71, the purpose of which will be subsequently described.

The filter actuator arm 72 is mounted for rotation, as shown by the arrow 78, on the underside of actuator plate 64 by a rivet 73, spacer 74 and spring biasing means 75. The filter actuator arm 72 has a projection 76 and a groove 77, the purposes of which will be subsequently described.

Referring to FIGURE 4, a slide assembly 80 is slidably secured to the base 12 by two screws (not shown) which extend through apertures 81 and 82. An upward projection 83 and a downward extending groove 84, the purpose of which will be subsequently described, form a part of the slide assembly 80. There are also two contact members 85—85, which are insulated from the remainder of the slide assembly 80 and rest on the circuit board 13. Two depressions 86—86 in the slide assembly 80 are designed to receive detent 87. The detent 87 is mounted with a spring arrangement (not shown) in the base 12. The slide assembly 80 moves between two positions, with the detent 87 being located in either one of the depressions 86—86. In the first position the contact members 85—85 connect the circuit network associated with contacts F and G and in the second position the contact members 85—85 connect the circuit network associated with contacts F and H.

The "Range Selector and On-Off" knob 26 fits over a cam assembly knob 91 both of which move together and are slidably mounted in the side aperture 92 of the base 12. The knob 26 can either be rotated about its own axis 95 or can be moved transversely inward towards the base 12. The rotational movement accounts for the "Range Selector" function and the transverse movement accounts for the "On-Off" function.

With respect to the "Range Selector" function, the cam assembly knob 91 has depending therefrom an eccentric arm 93 with a pin 94 mounted thereon. The pin 94 is positioned in the downward extending groove 84 of the slide assembly 80. The movement of the slide assembly 80 between its two positions, results in changing the scale observable in the window 19 and the associated circuit networks, which will be discussed subsequently in further detail.

With respect to the "On-Off" function of the knob 26, it is necessary to describe the "Pointer Release" button 28 in more detail at this point. The "Pointer Release" button 28 is spring mounted in knob 26 by spring 101, so that whenever the knob 26 is moved, the button 28 moves in conjunction therewith. Therefore, any reference to movement of knob 26 throughout the specification impliedly includes simultaneous movement of button 28. Only after the knob 26 is moved inwardly and it strikes a shoulder in the base 12, does the button 28 become functional. This functional aspect of the button 28 will be subsequently discussed. A knob shaft 102 is inserted through the cam assembly knob 91 and one end of the knob shaft 102 is in threaded engagement with the button 28. The other end 103 of the knob shaft 102 rests against the side of the arm assembly 66, so that as the knob 26 moves in a transverse direction along the axis 95 as shown by the arrow 104, the end 103 of the knob shaft 102 causes the arm assembly 66 to rotate about its pivot 67. In the normal off-position of the knob 26, the contact members 70—70 of the arm assembly 66 rest on the circuit board 13 immediately adjacent to contacts D and E. As the knob 26 is moved inwardly toward the aperture 92, the contact members 70—70 slide over contacts D and E, thereby connecting the circuit networks associated with said contacts.

As the knob 26 is moved inwardly, the pin 94 and arm 93 also move in the transverse direction. As mentioned above, the knob 26 and slide assembly 80 have two positions. In one of these positions the pin 94 and arm 93 are in transverse alignment with the projection 76 of the filter actuator arm 72, so that as the knob 26 is moved inwardly towards the base 12, the pin 94 strikes the projection 76 of the filter actuator arm 72. When this occurs the filter actuator arm 72 rotates in a counter clockwise rotation as shown by arrow 78 in FIGURE 5.

In one corner of the base 12 there is an aperture 110 in which a cell mounting plate assembly 112 is mounted by two screws 113—113. This plate assembly 112 has a cell mounting plate 114 with an aperture 115 therein through which the light cell 17 is inserted. The plate assembly 112 also has a linkage which comprises a pivot 116 which is rotatably mounted in the plate 114 connecting a link 117 on the top side of the plate 114 to a filter holder 118 on the bottom side of the plate 114. A filter 119 is mounted in the filter holder 118 and a filter lens 121 is mounted over the aperture 110 on the exterior side of the base 12. The link 117 has a pin 121 connected thereto at its free end which is positioned in the groove 77 of the filter actuator arm 72. (See FIGURE 5.) In the normal or in-position of the filter actuator arm 72 and mechanically linked filter holder 118, the filter intercepts any light aperture 16 before it impinges upon the light cell 17. However, when the filter actuator arm 72 is rotated in a counter clockwise direction the filter holder 118 is likewise rotated in a counter clockwise direction as shown by arrow 122, thereby allowing the incident light to directly strike the cell 17.

In another corner of the base 12 there is an aperture 120 in which the viewfinder 18 is mounted. At the other end of the base 12 a contour 123 is provided for mounting the battery 30 and battery chamber cover 29.

Referring to FIGURE 6, there are four important parts mounted on the extended posts 41 and 43 of studs 40 and 42, respectively, and overlying the actuator plate assembly 60. Two nuts 123—123 hold these parts onto the studs 40 and 42. These parts include a release plate 130, a sliding dial 140, a fixed dial 150 and a pointer clamp 160.

The galvanometer-type mechanism 20 shown in FIGURE 3 is mounted on the base 12 by studs 125—125 (see FIGURE 7) which are threadedly engaged with apertures 126—126. The zero adjuster 34 is in mechanical engagement with the pointer 21, in any well known manner. The pointer 21 is bent in such a way so that it is positioned above the release plate 130, and the fixed dial 150, but underneath the pointer clamp 160. This is readily seen in FIGURE 7.

The release plate 130 is positioned for transverse movement directly above the actuator plate 64. Washers 131—131 separate the release plate 130 from the actuator plate 64 below and the sliding dial 140 above to allow it to move freely. Oblong apertures 132—132 through which the posts 41 and 43 pass, allow the transverse movement. Release plate 130 has a right hand tab 133 and a left hand tab 134 depending therefrom. The right hand tab 133 is in alignment with projection 71 of the arm assembly 66. As the arm assembly 66 rotates in a clockwise direction (shown by arrow 67 in FIGURE 5) the release plate 130 is moved transversely. Also the left hand tab 134 is in alignment with the tab-like projection 50 on the battery check bracket 49, so that whenever the battery check circuit is actuated by moving the battery switch, the release plate 130 is similarly moved transversely. There is a piece of insulation 137 mounted on the left hand tab 134 to electrically isolate it from the battery check bracket 49. The release plate 130 is spring biased towards the right side of the base 12 by a return spring 135 (see FIGURE 4) positioned in slots in the base 12. The return spring 135 presses against the left hand tab 134. Whenever the release plate 130 is forced against the return spring 135, fluted elements 136—136 come into contact with depressions 162—162 in the pointer clamp 160 releasing the pointer 21. This will be discussed in detail later in the description.

Above the release plate 130 is the sliding dial 140. The sliding dial 140 has oblong apertures 141—141 through which the posts 41 and 43 pass, allowing the dial to move along a longitudinal axis of the meter. This scale has printed thereon two number scales, a low number scale 142 and a high number scale 143. There is a notch 144 in the right hand side of the sliding dial 140 in which the upward projection 83 of the slide assembly rides so that the sliding dial 140 moves from one position to another whenever the knob 26 is rotated between its two positions. There is also a T-type projection 145 on the sliding dial 140 which rides in the groove 65 of the actuator plate 64. The groove 65 and T-type projection 145 tend to guide the sliding dial 140.

Rigidly fastened to the posts 41 and 43, above the sliding dial 140, is fixed dial 150 which has two transversely extending apertures 152 and 153. Directly below aperture 152 a line graduation 151 is printed on the dial 150 and a similar line graduation 154 is printed above the aperture 153. The apertures 152 and 153 are positioned so that when the sliding dial 140 is in one position the low number scale 142 appears in aperture 152 and when the sliding dial 140 is in its second position the high number scale 143 appears in aperture 153. The line graduations 151 and 154 correspond with the low and high number scales 142 and 143, respectively, in order to obtain a reading based on the deflection of the pointer 21 of the mechanism 20.

Between the two line graduations 151 and 154 there is a single mark 155 preferably in a different color than the graduations. This mark indicates the position to which the pointer 21 should deflect when the battery check circuit is actuated, assuming the battery is in good condition.

Above the fixed scale 150 is mounted the pointer clamp 160 made of very thin sheet metal. This pointer clamp 160 which has a long groove 161 therein, is mounted so that it normally rests on the pointer 21 of the mechanism 20. When the release plate 130 is moved transversely, the fluted elements 136—136 contact the depressions 162—162 in the pointer clamp 160 causing the pointer clamp 160 to rise and allow the pointer 21 of the mechanism 20 to respond to any signal applied to the mechanism 20. Pointer stops 165—165 are mounted on top of the pointer clamp 160 to limit the deflection of the pointer 21.

A portion of FIGURE 7 illustrates the assembly of the elements discussed with reference to FIGURES 3 through 6 and wherever possible the major elements are appropriately numbered. The exploded portion of FIGURE 7 shows the cover 14 which is mounted on studs 125—125 by screws 170—170 and one additional screw 171 which goes through the cell mounting plate 114. A gasket 174 is positioned between the cover 14 and the viewfinder 18. A hub assembly 175 and calculator stud 176 are used to hold the three-piece calculator assembly 24 to the cover 14.

An index arm assembly 180 comprises a push button 181 which protrudes through the aperture 182 in the cover 114, an index arm 183 which is held at its prong-like end against the underside of the cover 14 by the hub assembly 175 and an index pin 184 which protrudes through a bushing 186 mounted in the cover 14.

A separate disk, not shown, having a plurality of holes around its circumference, is riveted to the underside of the top calculator dial 190. The index pin 184 of the index arm assembly 180 is designated to fit into any one of the holes, keeping the top calculator dial 190 stationary. Any one position of the top calculator dial 190 corresponds to a particular film speed which appears in the oblong aperture 191. The top calculator dial may be moved from one position to another by merely depressing the push button 181 of the index arm assembly 180. Co-operation between the three dials of the calculator assembly 24 is well known in the art and need not be discussed here.

Figure 8:
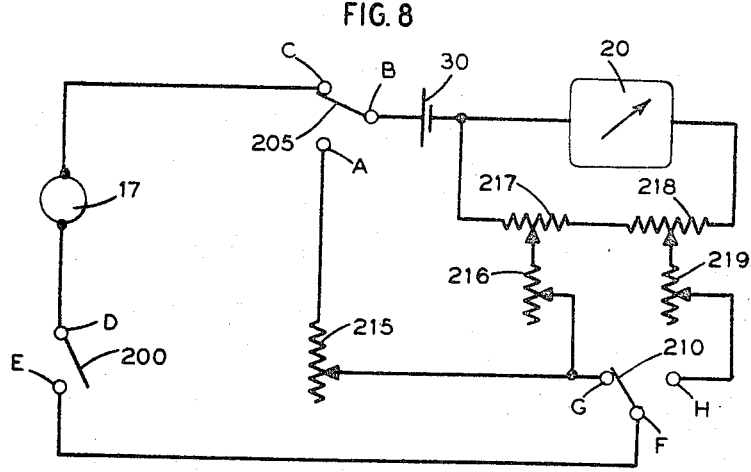
FIGURE 8 is a schematic diagram of the circuit arrangement printed on the printed circuit board.

FIGURE 8 illustrates a schematic of the circuit diagram printed on the circuit board 13. Switches 200, 205 and 210 correspond to the contact members 70—70, 51—51 and 85—85, respectively, and the terminals A through H correspond to the terminals A through H shown on the circuit board 13 in FIGURE 4.

Potentiometers 215, 216, 217, 218 and 219 are mounted on the back side of the circuit board 13 and accessible for appropriate adjustment through an aperture (not shown) in the back side of the base 12 and covered by nameplate 38.

Adjustments are made on the potentiometers 216 and 219 in one circuit arrangement which corresponds to the low number scale due primarily to the change in resistance versus impinging light characteristic of various light cells and secondarily due to differences in the sensitivities of various galvanometer-type mechanisms.

Adjustments are made on th potentiometers 216 and 217 in another circuit arrangement which corresponds to the high number scale due primarily to the two above-named variables as well as differences in the characteristics of various filters.

Finally an adjustment in potentiometer 215 in the battery check circuit will take into account the three variables mentioned with respect to potentiometers 216 and 217 since the latter two are in the battery check circuit as well as differences in the characteristics of various batteries.

OPERATION

An operator looks through the viewfinder 18 to direct the meter 10 in the direction in which he wants to measure the light intensity, causing incident light to impinge on the light cell 17. If the light intensity is relatively high, the "Range Selector and On-Off" knob 26 is turned in a clockwise direction as viewed in FIGURE 4 causing the high number scale 143 to appear in the window 19. This occurs due to the interaction between the upward projection 83 of the slide assembly 80 and the notch 144 in the sliding dial 140. When the knob 26 is in this position, the contact members 85—85 of the slide assembly 80 are in contact with terminals F and G. At the same time contact members 51—51 being in their normal position, are in contact with terminals B and C.

The knob 26 and button 28 are then pushed inwardly as shown by arrow 104 in FIGURE 4, since the button 28 moves whenever knob 26 is moved. As the knob 26 is pushed inwardly the contact members 70—70 of the arm assembly 66 come into contact with terminals D and E completing a circuit through the cell 17, battery 30, mechanism 20 and potentiometers 216, 217 and 218 (see FIGURE 8).

After the knob 26 has reached the end of its travel, continued pushing causes the button 28 to move further inwardly. This relative motion between the knob 26 and button 28 is made possible by spring 101. Relative motion by button 28 causes the projection 71 on the arm assembly 66 to come into contact with the right hand tab 133 of the release plate 130 which in turn raises the pointer clamp 160, allowing the pointer 21 to be deflected in accordance with the amount of current flowing through the mechanism 20. As the knob and button are released, it is important to note that the button 28 moves outwardly relative to the knob 26 and the pointer 21 is clamped by the pointer clamp 160 due to the action of the return spring 135 against the left hand tab 134 of the release plate 130. Only after the pointer 21 is clamped will the circuit be broken. The circuit is broken due to the action of the spring biasing means 69 which returns the arm assembly 66 to its normal position which in turn forces the knob 26 and button 28 back to their normal position by way of knob shaft 102.

During this entire sequence it should be noted that the filter 119 will remain in front of the light cell 17; accordingly, any light impinging on the cell 17 must first pass through the filter 119.

If, on the other hand, the light intensity is relatively low, the "Range Selector" knob 26 is turned in a counter-clockwise direction as viewed in FIGURE 4 causing the low number scale 142 to appear in the window 19. This occurs due to the interaction between the upward projection 83 of the slide assembly 80 and the notch 144 in the sliding dial 140. When the knob 26 is in this position, the contact members 85—85 are in contact with terminals F and H. At the same time contact members 51—51 are in their normal position which is in contact with terminals B and C.

When knob 26 and button 28 are pushed inwardly, contact members 70—70 complete a circuit just as before except that in this case the circuit contains potentiometers 217, 218 and 219 in addition to the cell 17, battery 30 and mechanism 20 (see FIGURE 8).

In addition, almost simultaneously with completion of the circuit, the pin 94 on the cam assembly knob 91 presses against projection 76 of the filter actuator arm 72 causing the filter actuator arm 72 to rotate in accordance with arrow 78 (see FIGURE 5). This in turns, by way of link 117, causes the filter holder 118 to rotate in accordance with arrow 122 (see FIGURE 4) and remove the filter 119 out of the path of the light impinging on the light cell 17.

Then after knob 26 has reached the end of its travel and button 28 is pushed further inwardly, the pointer 21 will be released by the pointer clamp 160 as previously discussed. However, this release will occur only after the circuit has been completed and the filter removed.

As the button 28 is released, it is important to note that the pointer 21 is first clamped by the pointer clamp 160 before the circuit is broken and the filter is placed back over the light cell 17. The return of the release plate 130 and the knob 26 and button 28 occur as already described. The filter holder 118 and filter 119 return to their normal position by the action of the spring biasing means 75 on the filter actuator arm 72.

After the operator obtains a reading from the deflection of the pointer 21, the calculator assembly 24 is used in a well known manner to obtain the proper camera diaphragm opening corresponding to a desired shutter speed.

Whenever the condition of the battery 30 is to be checked, the battery check switch 32 (button 45) moves the terminals A and B which completes the circuit through the battery 30, the mechanism 20 and potentiometers 215, 216, 217 and 218. The pointer 21 is then released to be deflected in accordance with the amount of current flowing through the mechanism 20 due to the tab-like projection 30 on the battery check bracket 49 and left hand tab 134 on the release plate 130. The battery is in good operable condition only if the pointer 21 is deflected to a point overlying the single mark 155 on the fixed scale 150. When the battery check switch 32 is released, the spring member 53 returns it to its normally off-position and the return spring 135 returns the release plate 130 to its normally clamp-position.

It will be obvious to those skilled in the art that various changes and modifications may be made therein without departing from the invention, and it is, therefore, intended to cover all such changes and modifications as fall within the true spirit and scope of the invention.

What is claimed is:

1. A photometer comprising: an inducating pointer; clamping means movable between a clamped and an unclamped position with respect to said pointer, said clamping means being normally biased to one of said positions; a photoelectric transducer; means for deflecting said pointer; switch means for selectively interconnecting said transducer and said means for deflecting said pointer, said switch means having an open and a closed position, said switch means being normally biased to one of said positions; and an actuating mechanism including means responsive to manual displacement for closing said switch means and a button movable both with and relative to the means responsive to manual displacement for shifting said clamping means between its two positions, said actuating mechanism being movable as a unit so that when the entire actuating mechanism is moved in one direction said clamping means is moved to said unclamped position and said switch means is closed and when said actuating mechanism is moved to said other position, said clamping means is shifted to said clamped position and said switch means is opened, the movement of said button causing said clamping means to shift to its clamped position prior to opening said switch means.

2. A photometer according to claim 1, wherein said means responsive to manual displacement is a knob and said button is spring mounted in said knob to allow for the relative movement.

3. A photometer according to claim 2, wherein the actuating mechanism further includes an arm assembly and a spring element which holds the arm in mechanical engagement with said knob and button.

4. A photometer according to claim 3, wherein the clamping means includes a spring element which acts on the button before the spring associated with the arm assembly acts on said button.

5. A photometer comprising: an indicating pointer; clamping means movable to a clamping position in which said pointer is held motionless and to an unclamped position in which said pointer is allowed to move, said clamping means being normally biased to one position; means for deflecting said pointer in response to an electrical signal; a radiation responsive transducer; circuit means interconnecting said transducer and said means for deflecting said pointer, said circuit means including a circuit portion which is mechanically movable to a first position in which the circuit is complete and a second position in which the circuit is open, said circuit portion being normally biased to one position; and manually operable actuating means having first means axially movable to actuate said circuit portion to either of said complete and open positions, and second means axially movable to actuate said clamping means to either of said unclamped or clamped positions, said second means being axially movable relative to said first means, said first and second means being connected so that when both first and second means are axially moved in one direction the clamping means is moved to said unclamped position and the circuit portion is complete and when both first and second means are axially moved in the other direction said clamping means is moved to said clamped position and then said circuit portion is moved to said open position.

6. A photometer comprising: an indicating pointer; clamping means movable to a clamping position in which said pointer is held motionless and to an unclamped position in which said pointer is allowed to move, said clamping means being normally biased to one position; means for deflecting said pointer in response to an electrical signal; a radiation responsive transducer; circuit means interconnecting said transducer and said means for deflecting said pointer, said circuit means including a circuit portion which is mechanically movable to a first position in which the circuit is complete and a second position in which the circuit is open, said circuit portion being normally biased to one position; a filter; filter actuating means operable to move said filter into the path of radiation incident on said transducer; and manually operable actuating means having first means axially movable to actuate said circuit portion to either of said complete and open positions; and second means axially movable to actuate said clamping means to either of said clamped or unclamped positions, said second means being axially movable relative to said first means, said first and second means being connected so that when both of said first and second means are axially moved in one direction the clamping means is moved to said unclamped position and the circuit portion is complete and when both of said first and second means are axially moved in the other direction said clamping means is moved to said clamped position and then said circuit portion is moved to said open position, said first means also being rotatable to preset said filter actuating means for movement of said filter.

References Cited

UNITED STATES PATENTS

| | | |
|---|---|---|
| 2,274,441 | 2/1942 | Williams. |
| 2,408,944 | 10/1946 | Miller. |
| 2,471,171 | 5/1949 | Stimson. |
| 2,472,381 | 6/1949 | McMaster. |
| 2,501,547 | 3/1950 | Stimson. |
| 2,584,440 | 2/1952 | Fogle. |
| 2,706,428 | 4/1955 | Pfaffenberger et al. |
| 2,982,174 | 5/1961 | Crandell. |
| 2,987,957 | 6/1961 | Louegrove. |
| 3,170,023 | 2/1965 | Barry et al. |
| 3,180,209 | 4/1965 | Crandell. |

JEWELL H. PEDERSEN, Primary Examiner

WARREN A. SKLAR, Assistant Examiner

U.S. Cl. X.R.

356—225, 234